UNITED STATES PATENT OFFICE.

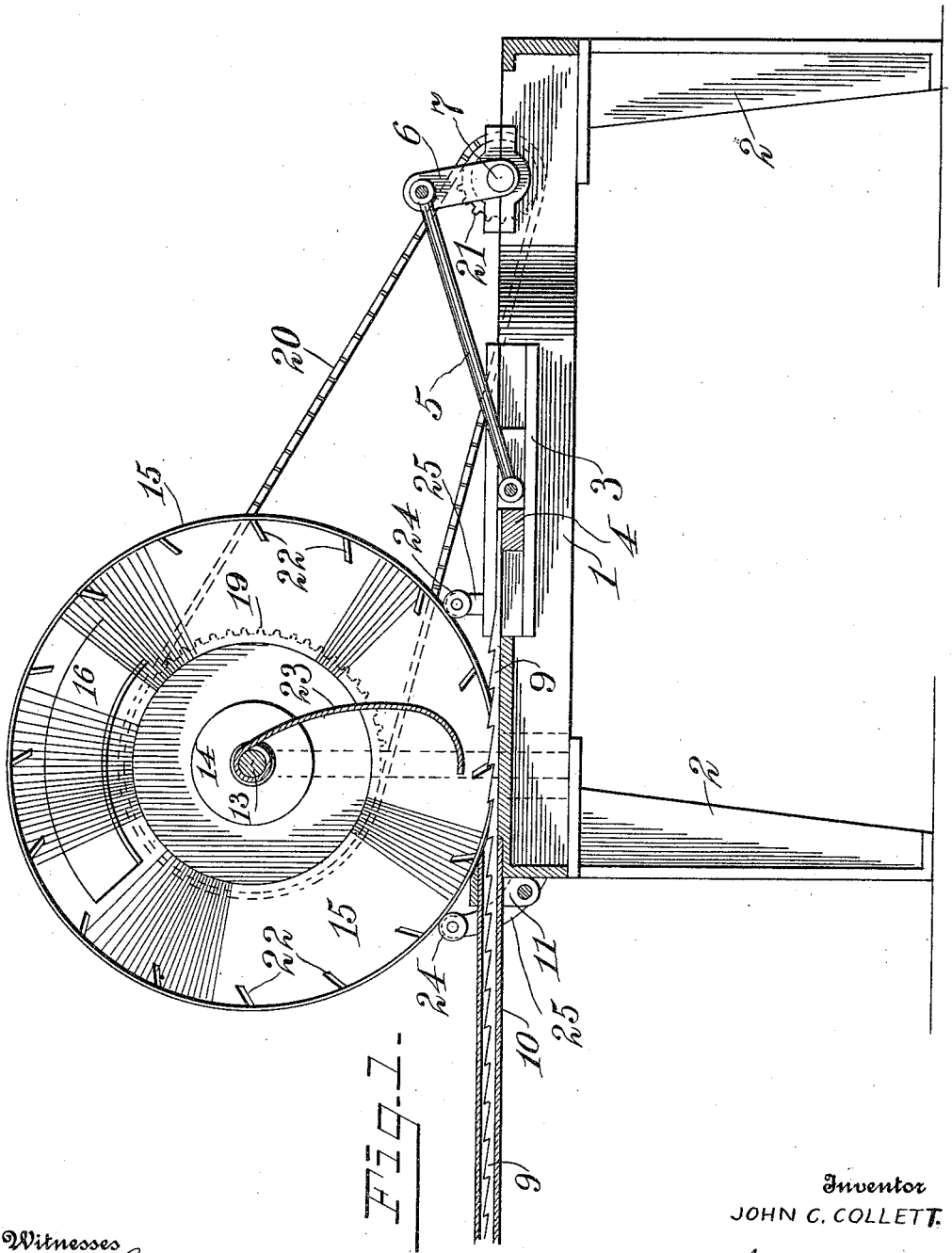

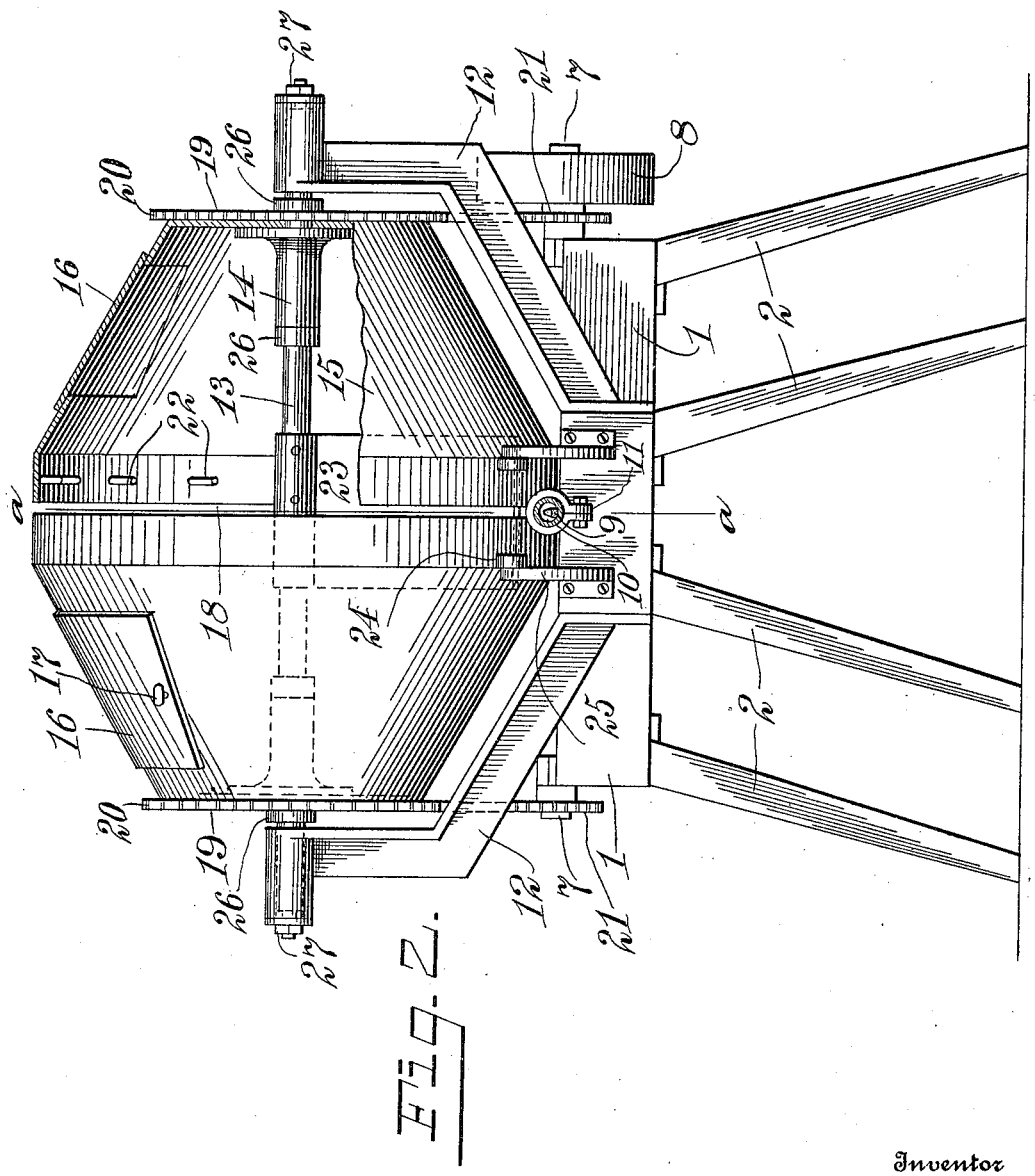

JOHN C. COLLETT, OF DAYTON, OHIO, ASSIGNOR TO THE FOGELSONG MACHINE COMPANY, OF DAYTON, OHIO.

COLLAR-STUFFING MACHINE.

999,549.   Specification of Letters Patent.   Patented Aug. 1, 1911.

Application filed August 5, 1910.   Serial No. 575,610.

*To all whom it may concern:*

Be it known that I, JOHN C. COLLETT, a citizen of the United States, residing at Dayton, in the county of Montgomery and State of Ohio, have invented certain new and useful Improvements in Collar-Stuffing Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in horse collar stuffing machines.

The object of the invention is to provide a horse collar stuffing machine in which tangled straw or hair, as it comes from the bale and without previous preparation, may be placed and successfully fed and packed into the collar. While being fed the straw is doubled upon itself, thus making the highest grade of collar.

Another object of the invention is to provide a machine of this type which will shake out the short straw and chaff, thereby allowing only the long straw to be fed.

Referring to the annexed drawings, Figure 1 is a longitudinal sectional elevation on the line $a$—$a$ of Fig. 2; and Fig. 2 is a front elevation with portions broken away.

Throughout the specification and drawings, similar reference characters indicate corresponding parts.

Referring more particularly to the drawings, 1 represents a base supported by legs 2. The base 1 is provided with guides 3 in which a cross-head 4 is adapted to reciprocate. The cross-head 4 is attached to a connecting rod 5 which is in turn connected to a crank 6 on a shaft 7. The shaft 7 is journaled on the base 1 and is provided with a drive pulley 8 by means of which the shaft 7 is rotated and the cross-head 4 reciprocated. Attached to the cross-head 4 and extending rearwardly, is a feed rod 9 of well known construction. This feed rod extends into a stuffing tube 10 attached to the base 1 by means of a clamp 11. When the machine is in operation, the stuffing tube 10 projects into a collar (not shown); and when the feed rod is reciprocated by means of the cross head 4, said feed rod will feed straw into the tube and pack the same into the collar, from a hopper mounted above the feed rod.

The hopper is constructed as follows: At the forward portion of the base member 1, and extending from each side thereof, are two arms 12 which support a horizontal axle 13. Adapted to rotate on said axle are two bearings 14, each of which supports a conical hopper portion 15, which receives the straw to be fed to the collar. The straw is introduced into the hopper in a tangled condition, through doors 16 provided with any suitable catch 17. The two conical hopper portions 15 are separated at their inner edges to form a space 18 through which the feed rod 9 reciprocates at the bottom of the hopper. The bearings 14 are held in place on the shaft 13 by collars 26; and the position of the shaft 13 may be adjusted by means of nuts 27 to regulate the relation between the slot 18 and the feed rod 9.

To allow all the straw to be engaged at some time by the feed rod, the hopper may be rotated as follows. On the outer end of each of the conical hopper portions 15 is a sprocket 19 around which passes a chain 20, and which also passes around sprockets 21 on the shaft 7. When the shaft 7 is rotated, the hopper is also rotated and the straw within the same is carried around by being engaged by pins 22 on the interior of the hopper. To allow the teeth of the stuffing rod to effectually engage the straw, there is provided a curved plate 23 mounted on the axle 13. When the rotating straw approaches the feed rod, it is pressed against the latter by means of the curved plate 23. As the conical portions 15 are supported by the axle 13 at their outer ends, there are provided rollers 24 mounted on brackets 25 which engage the conical portions near the space 18 and prevent their sagging. When the straw is rotated by the hopper, those strands which lie across the feed rod at approximately right angles thereto, will be engaged and fed by the feed rod, but the angular strands will at some time be presented to the feed rod at a right angle due to the agitation of the straw and the presence of the plate 23 and pins 22. As the axis of the hopper is at a right angle to the feed rod, it will be seen that the rotation of the hopper will have a tendency to straighten out the strands of straw so that they will lie parallel with the axis of the hopper and at right angles to the feed rod. When the straw is engaged by the feed rod at right angles, it is folded and fed into the collar, thereby making the most rigid pad. The rotation of the hopper agitates the straw, and therefore the chaff and short straw will be separated from the long straw through the action of centrifugal force. The space 18 provides an outlet for the chaff and short straw, thereby preventing poor material being carried into the collar by the long straw.

Without limiting myself to the precise arrangement shown and described, I claim:

1. In a machine of the type specified, the combination with a stuffing tube, a feed rod adapted to reciprocate in said tube, and means for reciprocating said feed rod, of a hopper mounted above said feed rod and adapted to supply straw or hair to said feed rod, the axis of the hopper lying at an approximate right angle across the feed rod, and means for rotating the hopper.

2. In a machine of the type specified, the combination with a stuffing tube, a feed rod adapted to reciprocate in said tube, and means for reciprocating said rod, of a rotating hopper having a circumferential slot mounted above said rod, the slot allowing the feed rod to engage the straw on the interior of the hopper, and means for rotating the hopper.

3. In a machine of the type specified, the combination with a stuffing tube, a feed rod adapted to reciprocate therein, and means for reciprocating said rod, of a hopper composed of conical sections spaced apart to form a slot, said hopper being mounted above said feed rod, and the slot allowing said feed rod to engage the straw in the hopper, and means for rotating said hopper.

4. In a machine of the type specified, the combination with a stuffing tube, a feed rod adapted to reciprocate in said tube, and means for reciprocating said feed rod, of an axle mounted above said feed rod and at an approximate right angle thereto, two conical hopper portions mounted on said axle, the lower inner edges thereof lying on each side of the feed rod, and means for rotating said conical hopper portions.

5. In a machine of the type specified, the combination with a stuffing tube, a feed rod adapted to reciprocate in said tube, and means for reciprocating said feed rod, of an axle mounted above said feed rod and at an approximate right angle thereto, two conical hopper portions mounted on said axle, the lower inner edges thereof lying on each side of the feed rod, means for rotating said conical portions, and a plate mounted on said axle and lying above the feed rod.

In testimony whereof I affix my signature, in presence of two witnesses.

JOHN C. COLLETT.

Witnesses:
R. J. McCarty,
Matthew Siebler.

---

Copies of this patent may be obtained for five cents each, by addressing the "Commissioner of Patents, Washington, D. C."